Oct. 16, 1923.

C. TRUTTA

FOOD CUTTER

Original Filed Nov. 11. 1922    2 Sheets-Sheet 1

1,471,313

Witness

Nils E. Goodtclive

Inventor
C. Trutta
By his Attorney Geo. F. Beeler

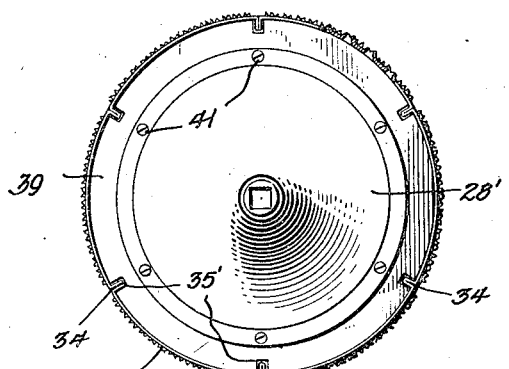
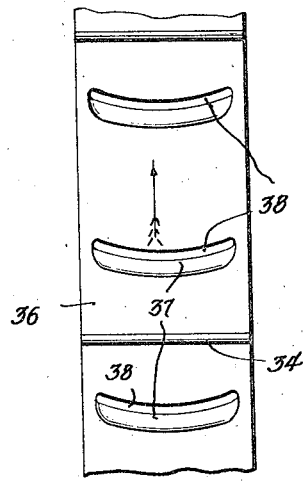
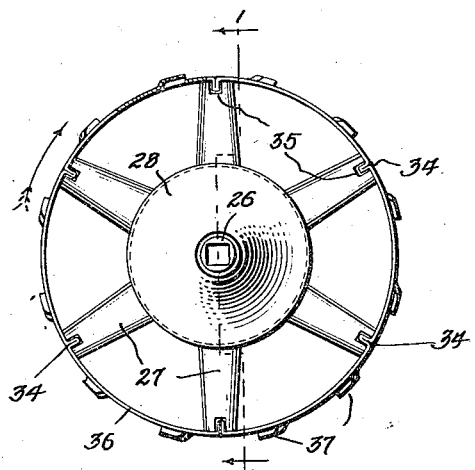

Patented Oct. 16, 1923.

1,471,313

UNITED STATES PATENT OFFICE.

CESARE TRUTTA, OF NEW YORK, N. Y., ASSIGNOR OF ONE-HALF TO NICOLA RINALDI, OF NEW YORK, N. Y.

FOOD CUTTER.

Application filed November 11, 1922, Serial No. 600,194. Renewed September 7, 1923.

*To all whom it may concern:*

Be it known that I, CESARE TRUTTA, a subject of the King of Italy, but having declared my intention of becoming a citizen of the United States, residing at New York city, borough of Manhattan, in the county of New York and State of New York, have invented certain new and useful Improvements in Food Cutters, of which the following is a specification.

This invention relates to culinary appliances and especially to those devices employed either in housholds or any kitchens generally for the preparation of food products.

Among the objects of the invention is to provide an improved device for the reduction of large masses of foods such as stale bread, crackers, cheese, green vegetables, or the like to a finer condition.

Among the specific objects of the improvement is to provide a suitable casing with means for feeding and forcing the original commodity into and therethrough, there being provided within the casing a suitable mechanism including a rotating shell having facilities for slicing, chopping, grating, or otherwise reducing the original commodity to a finer condition. The shell portion of the device, being of an interchangeable nature, requires practically no effort or time on the part of the operator for its adaptability to various commodities and the specific results to be realized.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 2 is a side elevation of a modified form of reducing member and supporting disk therefor.

Fig. 3 is a view similar in character to Fig. 2 but showing the same form of supporting mechanism as in Fig. 1 and a slicing attachment or shell, a part of the latter being in section.

Fig. 4 is a fragmentary plan view of the slicing shell of Fig. 3.

Figure 1:
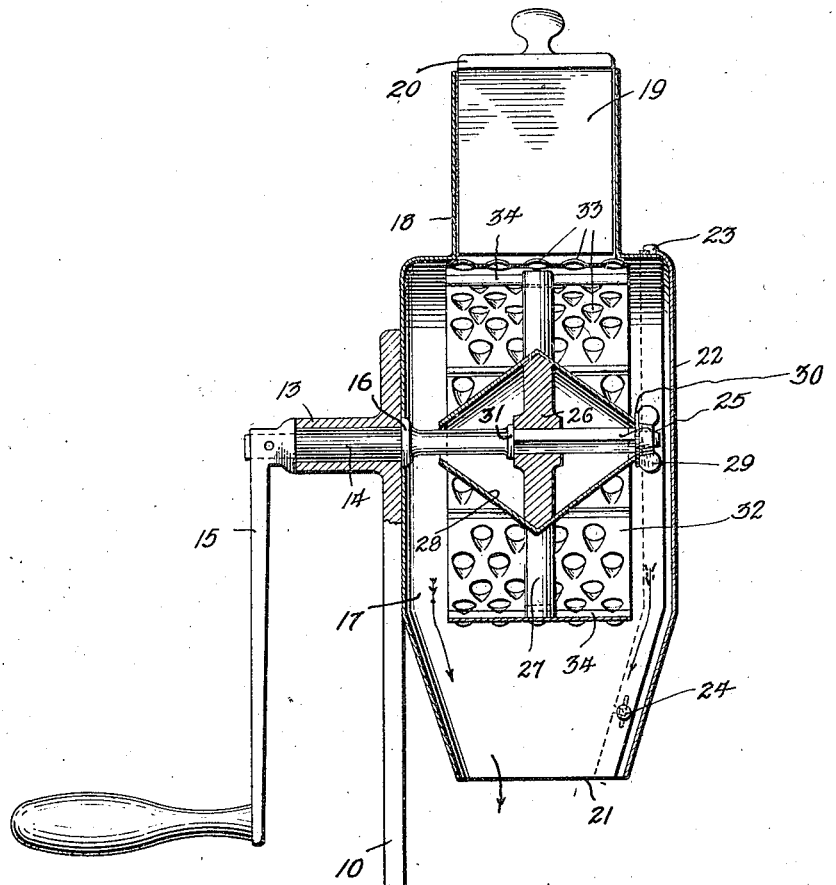
Figure 1 is a vertical section of one embodiment of the invention, the head and spider parts being in section about on the line 1—1 of Fig. 3.

Referring now more specifically to the drawings I show a frame 10 including a clamping jaw 11 adapted to embrace the edge of a table or other like support where it may be clamped by the use of a thumb screw 12 or its equivalent. The main portion of this frame 10 comprises an upright standard including a sleeve 13 near the top in which is journaled an operating shaft or arbor 14 having secured in any suitable manner to one end an operating crank 15. This arbor is held from endwise movement toward the crank by any suitable means such as a collar 16 bearing against the inner surface of the standard.

17 indicates a casing secured to the upper portion of the standard with the side thereof next to the standard in the same plane as the collar 16. This casing may be of any suitable size or design and is of a length in the direction of the axis of the arbor sufficient to accommodate the arbor and the parts supported thereon. To the upper portion of the casing is fixed a receiver or hopper 18 into and through which the food commodities to be reduced are fed by any means including a plunger 19, the cross section of which corresponds to that of the receiver, the plunger being provided with shoulders or flanges 20 which striking against the top of the receiver will limit the downward movement thereof so that the plunger will not come into contact with the movable parts beneath it. The lower portion of the casing is open at 21 for delivery of the reduced commodity therethrough into any suitable dish or the like that may be located below it for this purpose. The casing includes also a removable cover or cap 22, the upper portion of which may be hooked in place at 23, and the lower portion of the cap may be locked detachably in place by any suitable fastener 24. The cap includes preferably a flange which co-operates with the adjacent edge portion of the casing 17.

The end portion 25 of the arbor remote from the crank and adjacent to the cap is reduced and preferably squared or otherwise arranged for the removably securing thereto of a hub or disk member to be rotated by the arbor and crank. In Figs. 1 and 3 this member comprises a spider having a hub from which radiate a series of spokes 27, and secured upon the hub 26 is a double cone structure 28 whose bases coincide with each other in the central plane of the spider and whose points or apexes reach close toward the collar 16 and cap 22, respectively, or adjacent to the end portions of the casing. These cones may be formed of sheet metal or any other suitable material. The entire spider, including the cones, is securable in fixed position upon the arbor by any suitable means such as a winged nut 29 threaded upon the extreme end of the arbor and bearing against a washer 30, whereby the spider is held against a shoulder 31 formed on the arbor.

32 indicates the cutting or reducing shell, the same being of a hollow cylindrical or circular form and made preferably of sheet metal and provided with a multiplicity of suitably sized and designed holes 33 to serve as individual cutters such as would be suitable, for example, for chopping cabbage, turnips, green peppers, crackers, or other commodities. This shell 32 is detachably secured on the spider or spokes 27, and as one practical and convenient means for accomplishing this I provide on the interior surface of the shell one or more inwardly extending ribs or projections 34 which may have interlocking co-operation in similarly formed notches 35 in the outer ends of the spokes. After the cap 22 is removed from the casing the shell 32 may readily be slipped into place as shown in Fig. 1 or removed therefrom in a direction parallel to and coaxial with the arbor 14. Locking means (not shown) might be provided to prevent accidental endwise movement of the shell with respect to the spider but I have found that with the spider spokes made of wood there is ordinarily sufficient frictional contact between the shell and the spider to hold these parts in proper position. It will be noted also that the attachment or the removal of the shell 32 may be effected without disturbing the means for securing the spider to the arbor. As thus far described and shown in Fig. 1 any material introduced into the receiver and fed toward the shell will be quickly chopped and reduced coincident with the rotation of the crank, arbor, and cutter, and the chopped material after being delivered through the cutting shell into the interior thereof will be directed over the double cone 28 so as to drop freely along the end portions of the casing as shown by the arrows in Fig. 1. The instrument therefore is of not only a simple and convenient construction but one that is thoroughly reliable and sanitary because there are no crevices or other places for any of the material to lodge and become offensive.

The modification of cutter shell 36 in Figs. 3 and 4 is designed especially for slicing cucumbers, radishes, cabbage, or the like, the slices being formed by blades 37, each of which is produced from the sheet metal as a result of the formation of a slot 38, the intended direction of movement of the cutter shell in all cases being indicated by the arrows. It will be noted that the slices of material in this form of the device will be delivered between adjacent spokes 27 to the cones 28 whence they will be delivered along the ends of the casing and beyond the planes of the ends of the shell. The shell 36 is provided with the ribs 34 the same as above described and for the same purpose.

Instead of the spider having the hub and spokes I may employ a head disk 39, see Fig. 2, the periphery of which is provided with notches 35' for co-operation interchangeably with any of the forms of reducing members shown herein. The cutter 40 shown in Fig. 2 is designed especially for the grating of horseradish, carrots, turnips, or the like, but as in all other cases is preferably provided with inwardly projecting lugs or ribs 34. The cones 28' in this form of the device may be larger in diameter and may be independently connected as by screws 41 to the opposite sides of the disk. Their mode of operation however is the same as in the other cases.

It will thus be seen that I have provided a relatively simple, practical, and sanitary household implement which may be accompanied with any suitable number of cutting or reducing members that may readily be interchangeable selectively and used in connection with the crank operated hub or disk provided within the casing, according to the work to be performed.

I claim:

1. In a device of the nature set forth, the combination of a support, a casing fixed thereto, an arbor journaled in the support and extending into the casing, means to feed material to the casing, and reducing means for the material fixed upon the arbor within the casing, said reducing means including a hollow cylindrical cutting member and means secured to the arbor and located within the cutting member serving to direct the reduced material beyond the ends of the cutting member whence it may drop freely from the casing.

2. A device as set forth in claim 1 in which the cutting means includes a member fixed upon the arbor and having a double cone device carried thereby for directing the reduced material toward both ends of the casing and also including a cutting member detachably secured to the parts aforesaid.

3. A food cutter including an arbor, a spider rotatably fixed thereto for rotation therewith, the parts of the spider remote from the arbor being provided with notches, means to lock the spider to the arbor, and a circular cutter detachably fitted to the notched portions of the spider for removable connection thereto independently of the means for securing the spider to the arbor, said cutter including means extending inward in co-operation with the notches to prevent relative rotation between the cutter and the spider.

4. Mechanism as set forth in claim 3 including means carried by the spider for shedding the reduced material outward beyond the planes of the ends of the cutter.

5. In a device of the nature set forth, the combination of an arbor, a cutter support fixed thereto for rotation therewith, a circular cutter removably fitted to the cutter support and held thereby from rotation independent of the arbor and cutter support, and means within the cutter for so directing the reduced material as to compel it to fall outside of the cutter, said directing means being fixed to the arbor and remaining in place though the cutter be removed.

In testimony whereof I affix my signature.

CESARE TRUTTA.